March 31, 1953 A. E. CALDWELL 2,633,442
METHOD OF MAKING TUFTED MATERIAL
Filed March 8, 1949 2 SHEETS—SHEET 1
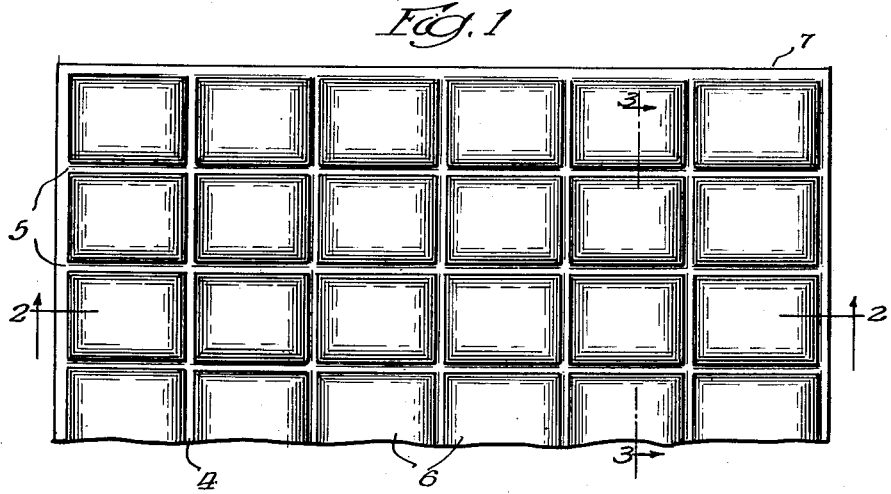
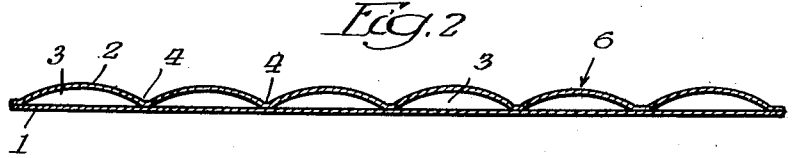
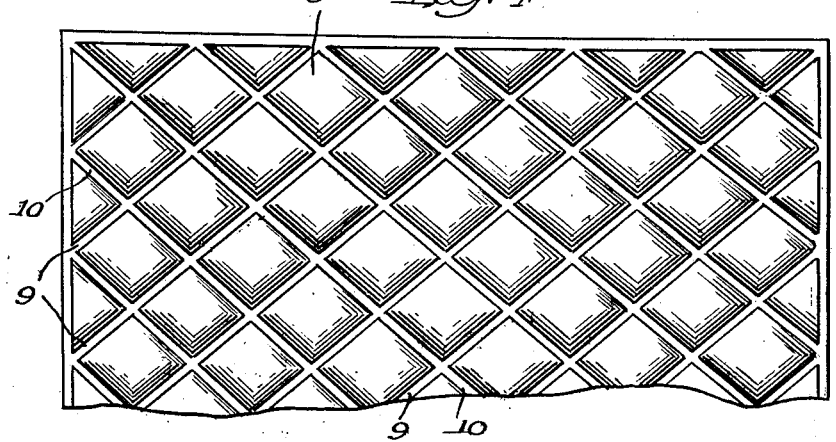
Inventor
Albert E. Caldwell
By: Spencer, Marzall, Johnston & Cook
Attys March 31, 1953 A. E. CALDWELL 2,633,442
METHOD OF MAKING TUFTED MATERIAL
Filed March 8, 1949 2 SHEETS—SHEET 2
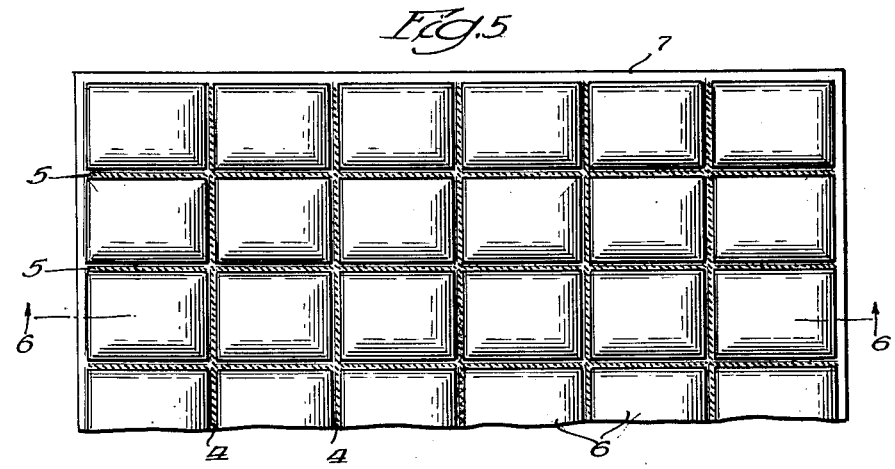
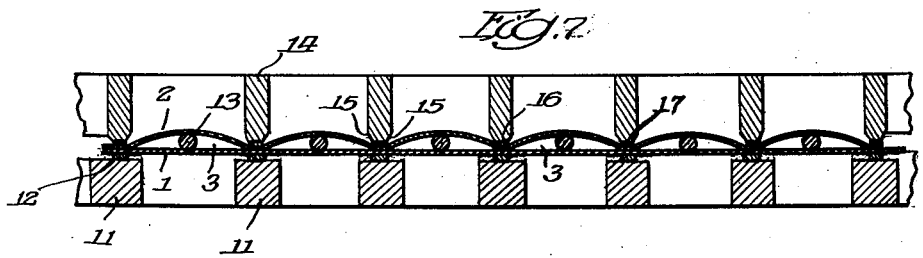
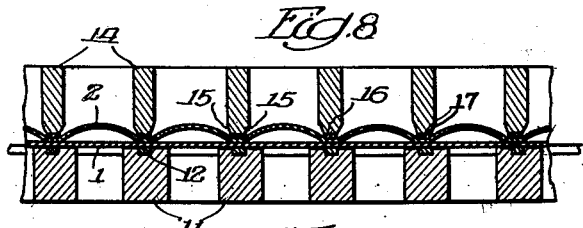
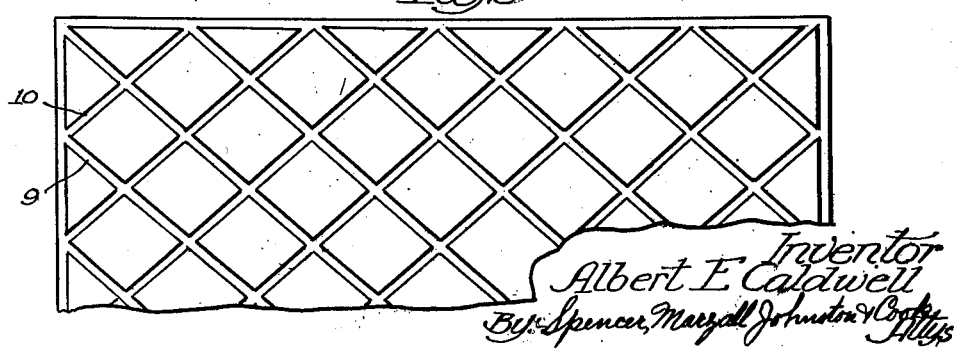
Inventor
Albert E. Caldwell
By Spencer, Marzall, Johnston & Cook
Attys

Patented Mar. 31, 1953

2,633,442

UNITED STATES PATENT OFFICE 2,633,442

METHOD OF MAKING TUFTED MATERIAL

Albert E. Caldwell, Galesburg, Ill.

Application March 8, 1949, Serial No. 80,291

1 Claim. (Cl. 154—106)

This invention relates in general to a tufted sheet material and to the method of manufacture thereof. The sheet material is preferably heat-sealable, such as a thermoplastic.

The article is referred to herein as a tufted sheet material, but is to be distinguished from other tufted articles wherein a filler is used between two sheets. Tufted sheets have been produced heretofore from thermoplastic materials wherein a soft substance such as cotton, fiber glass, and the like, is placed between two sheets are thereafter secured together in spaced apart and intersecting lines of stitching, thereby resulting in a plurality of adjacent tufts between the sealing lines.

In the present invention the intermediate filler layer is omitted and air is trapped between the sealing lines, thereby to produce a plurality of adjacent, individual air pockets. It will be evident that in order to prevent the entrapped air from leaking out of the individual pockets, it is necessary to have a complete seal around the periphery of each of the pockets between the two sheets of material. For this reason it is preferable to use superposed sheets of a thermoplastic material which are capable of being sealed together along predetermined lines by the application of heat. The method utilized is a special one devised to produce this particular result as will be brought out more clearly hereinafter in the detailed description of the invention, although the machines for carrying out the invention may vary, or the method may be performed by hand.

In accordance with the foregoing, it is one of the principal objects of the present invention to provide a tufted sheet of material wherein two superposed sheets of the material are secured together along predetermined lines in such a way as to provide a plurality of air pockets between the two sheets.

Another object of the invention is to provide a tufted sheet of material wherein two superposed sheets of a thermoplastic are heat-sealed together along predetermined lines, and wherein the areas between the intersecting seal lines have air entrapped between the sheets, thereby to provide a plurality of air pockets.

A further object of the invention is to produce a tufted sheet material wherein air is trapped in a plurality of individual pockets and the two sheets forming the top and bottom sides are formed of a heat-sealable thermoplastic material and are heat-sealed together around the periphery of each of the individual air pockets.

Still another object of the invention is to provide a method of producing a plurality of individual air pockets between two superposed sheets of a thermoplastic material.

A still further object of the invention is to provide a method of producing a tufted sheet material which includes separating superposed sheets of a thermoplastic material into individual air pockets and thereafter heat-sealing the sheets together around the periphery of each of the air pockets.

Another object of the invention is to provide a method of producing a tufted sheet material having a plurality of individual air pockets between superposed sheets of a thermoplastic, wherein the superposed sheets are clamped together at spaced intervals and heat applied along the lines where the sheets are clamped at a sufficient temperature and for a sufficient length of time to cause the two sheets to fuse together and form a seal.

It is a further object to provide suitable means for separating the two thermoplastic sheets between the sealing lines so that after the seal has been completed, air will be trapped between the seal lines.

Still another object of the invention is to provide a novel method of heat-sealing two superposed sheets of a thermoplastic material along predetermined lines to thereby provide a plurality of individual air pockets, wherein the heating elements utilized to apply heat to the thermoplastic sheets are supported by a resilient insulating material resulting in a cushioning effect when the two sheets are clamped together thereby preventing distortion and thinning of the thermoplastic.

Other objects and advantages of the invention will become apparent upon reading the following description taken in conjunction with the accompanying drawings in which:

Fig. 1 is a plan view of a tufted thermoplastic sheet made in accordance with the present invention;

Fig. 2 is a vertical longitudinal sectional view along the line 2—2 of Fig. 1;

Fig. 3 is a transverse sectional view along the line 3—3 of Fig. 1;

Fig. 4 is a plan view of a modified form of tufted material wherein the air pockets are substantially diamond-shaped rather than rectangular;

Fig. 5 is a plan view of a tufted material similar to that shown in Fig. 1 and made in accordance with the method shown in Figs. 7 and 8;

Fig. 6 is a sectional view along the line 6—6 of Fig. 5;

Fig. 7 is a vertical sectional view in somewhat diagrammatic form illustrating the preferred method of heat-sealing to obtain the air pockets;

Fig. 8 is a view further illustrating the method of Fig. 7, but taken along a sectional plane at substantially right angles to that of Fig. 7; and Fig. 9 is a plan view of a tufted material similar to Fig. 4 but showing the diamond-shaped air pockets rather than the rectangular air pockets which may also be produced by the method illustrated in Figs. 7 and 8.

With respect to the article itself, it is provided with superposed sheets of material wherein the bottom sheet is indicated by the numeral 1 and the top sheet by the numeral 2. Referring particularly to Figs. 1 to 4, inclusive, when the two sheets are first placed one over the other, any suitable means may be utilized to separate the sheets 1 and 2 to provide air pockets 3. The two sheets are then sealed together along the lines 4 which are suitably spaced apart thereby to provide a plurality of the adjacent air pockets 3. In the first instance when the seal lines 4 are applied, there will result a plurality of adjacent elongated air pockets between the two sheets. The transverse seal lines indicated at 5 are then applied at any suitable angle to the first seal lines 4. As shown in Fig. 1, the seal lines 4 and 5 are at right angles to each other, thereby providing a plurality of the areas 6 which are rectangular in shape and each of which constitutes an air pocket 3. The completed sheet will also have a seal around the periphery thereof as at 7, so that the finished article comprises a tufted sheet of material wherein the tufts are composed of a plurality of adjacent individual air pockets.

As stated hereinabove, in order to retain the entrapped air in the individual pockets, it is necessary that the seals 4 and 5 be continuous and for this reason a sewing or stitching operation would be unsatisfactory since the air could easily leak out between the stitches. The heat-seal applied to these seal lines 4 and 5 produces a continuous seal wherein the two sheets of material are fused together thereby trapping the air in the individual pockets and preventing any escape thereof. Such a heat-seal is adapted to be used with a thermoplastic material and any such sheet material may be used which is capable of being heat-sealed.

Fig. 4 illustrates a modified form of the tufted sheet from that shown in Fig. 1 wherein the areas 8 are substantially diamond-shaped and each constitutes an individual air pocket separated from the adjacent air pockets by means of the diagonal seal lines 9 and 10.

It will be evident that numerous designs may be produced depending upon the apparatus which is used to produce the final product. The method used in each case, however, will be substantially the same. The angles between the intersecting seal lines may be varied throughout substantially 180° so that various shapes and sizes of air pockets may be produced. Irregular designs are made possible by the shape of the heating elements used to produce the seal lines and need not necessarily be in a continuous straight line as illustrated in Figs. 1 and 4.

The method utilized in producing the tufted material shown in Figs. 1 to 4, inclusive, constitutes in general the application of heat and pressure along predetermined lines simultaneous with the separation of the two sheets of thermoplastic material between the lines along which the heat is applied. This separation may be done in a number of different ways, but one method which has been found to be very satisfactory, is to utilize small elongated rods placed between the thermoplastic sheets to elevate and separate the upper sheet from the lower sheet between the lines along which the heat is applied.

This method is illustrated more clearly in Figs. 7 and 8 where the novel impression sealing or cushion sealing method is utilized.

In carrying out this method there is provided a support consisting of a plurality of supporting members 11 preferably resilient and formed of an insulation material. In actual practice, fiber glass has been found to operate satisfactorily for this purpose. Heating elements or wires 12 are located lengthwise on the flexible insulating support members 11, and the bottom sheet 1 of thermoplastic material is placed over these supports and heating elements. A plurality of separators in the form of elongated rods 13 are then placed on top of the bottom sheet 1 between the supporting members 11. The upper sheet 2 of thermoplastic material is then laid over the separator rods 13 whereupon the two sheets will become separated along predetermined lines between the lines where the heat will be applied by the heating elements 12.

A plurality of pressure members 14 are located above the resilient supports 11, and preferably have converging edges 15 adjacent the lower sides thereof terminating in a bottom edge 16 which is narrower than the pressure member 14 itself. The bottom edge 16 is covered with a strip of resilient insulating material 17 for a purpose which will appear more fully hereinafter. These members 14 and resilient insulating strips 17 are adapted to be in direct alignment vertically with the heating elements 12 so that when they are brought downwardly against the upper sheet 2, the upper and lower sheets will be pressed together against the heating elements 12. Fig. 7 illustrates the position of the various parts prior to the application of full pressure where the heating elements 12 are still resting on the supports 11. At this point the two sheets 1 and 2 will have been separated from each other between the lines formed by the heat-seal.

Fig. 8 illustrates the application of the heat-seal along lines angularly disposed with respect to the lines shown in Fig. 7 after the rods 13 have been removed. This illustrates, however, the position of the various parts during the application of the pressure thereto where the heating elements 12 are more or less imbedded in the resilient insulating supports 11.

At the time pressure is applied between the pressure elements 14 and the supporting members 11, electric current is passed through the heating elements 12 for a short period of time, sufficient only to fuse the two sheets of thermoplastic together only along the lines occupied by the heating elements. The result will be a continuous heat-seal along spaced apart lines, between which lines the two sheets have been separated by the rods 13.

At this point it is important to note that one of the features of the invention resides in the resilient character not only of the insulated supporting members 11, but also of the insulating strips 17. If this were a solid support, the heating elements 12 would be apt to apply the heat over a larger area of the thermoplastic sheets than the width of the heating element. That is, heat would be dispersed outwardly to the thermoplastic sheets rather than being confined to the smaller surface of the heating element, resulting in a distortion and thinning of the thermoplastic sheet on each side of the heating elements.

The same thing is true with respect to the strip 17, which is really the more important. This strip 17 is preferably formed also of fiber glass or a similar type of woven insulation having low heat absorbent qualities, and which provides a cushion effect. The strip must also be wide enough to prevent distortion of the seal. The cushioning effect is more desirable under the upper support or strip 17. It has been found that when a rigid or solid insulating support is used, the heat is absorbed so rapidly that it is impossible to obtain commercial speed of production.

The use of the method herein described and illustrated, where the pressure is applied only along a very narrow length of resilient insulating material and the heating element becomes imbedded in the resilient insulated support confines the heat only to the area at which the pressure is applied, and thus a perfect seal between the two thermoplastic sheets is obtained, and at the same time the distortion and thinning of the sheets are prevented.

After the two sheets have been heat-sealed by the process illustrated in Fig. 7, the rods 13 may be removed and the two sheets then rotated through any desired angle, at which time the pressure elements 14 and strip 17 are again brought downwardly against the heating elements and pressure applied thereto as shown in Fig. 8. Again current is caused to flow through the heating elements 12 sufficient only to cause a fusion of the two thermoplastic sheets. After the application of this second set of heat-seals, the product is finished and may appear either like that shown in Figs. 1 and 5 or in Figs. 4 and 9.

If an irregular design is desired, then the heating elements 12 may be modified to extend in an irregular path so that the seal lines will follow such path. It will also be clear that other means than the rods 13 may be utilized if so desired to cause a separation of the two thermoplastic sheets at the time of applying the initial seals. For example, the upper sheets may be held by hand and the seal lines applied singly. It is also possible to apply a blast of air between the two sheets or a vacuum could be applied to the upper sheet, either of which methods would be satisfactory to separate the sheets between the seal lines.

The multiple sealing of the two sheets by the application of heat along a plurality of predetermined lines or paths renders the final product capable of being produced on a commercial scale and at a relatively low cost. The method of making the product disclosed herein dispenses with the cost of a filler such as is used at the present time, and therefore the material may be produced more economically.

The material itself has found application in many fields such as upholstering, rug pads, aprons, bedspreads, and the like. The use of the woven and resilient insulating pressure strip 17 such as fiber glass imparts a design along the seal lines on the top thereof similar to that illustrated in Fig. 5 which may be said to simulate stitching and thus imparts an additional advantage to the material in that it has a pleasing appearance.

Changes may be made in the form, arrangement and design of the individual air pockets of the tufted material which forms the present invention, and changes may also be made in the steps utilized in the method of manufacturing this material without in any way departing from the spirit of the invention or sacrificing any of the attendant advantages thereof, provided, however, that such changes fall within the scope of the claim appended hereto.

The invention is hereby claimed as follows:

The method of making a tufted sheet of material which comprises the steps of placing a thermoplastic sheet over a plurality of spaced heating elements mounted on a resilient insulated support, applying a second sheet of thermoplastic over said first sheet, inserting a plurality of separating members between said sheets at spaced locations between said heating elements thereby to separate predetermined portions of said sheets, applying pressure to said sheets along said heating elements to partially imbed the heating elements in said resilient support, applying sufficient heat to said heating elements to heat-seal said thermoplastic sheets together between the separated portions thereof, removing said separating members from between said sheets, and thereafter heat-sealing said sheets together along lines intersecting the lines formed by the first heat-sealing step, thereby to produce a plurality of air pockets individually sealed around the periphery thereof.

ALBERT E. CALDWELL.

REFERENCES CITED

The following references are of record in the file of this patent:

UNITED STATES PATENTS

| Number | Name | Date |
|---|---|---|
| 2,262,493 | Guinzburg | Nov. 11, 1941 |
| 2,338,490 | Cunnington | Jan. 4, 1944 |
| 2,486,759 | Pfeiffer | Nov. 1, 1949 |